(12) United States Patent
Osuda et al.

(10) Patent No.: US 7,232,504 B2
(45) Date of Patent: Jun. 19, 2007

(54) APPARATUS AND METHOD FOR DISTILLING WASTE LIQUIDS

(75) Inventors: Hiroshi Osuda, Kasugai (JP); Toru Matoba, Kasugai (JP); Daisuke Adachi, Kasugai (JP); Masataka Fukuizumi, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/301,782

(22) Filed: Nov. 22, 2002

(65) Prior Publication Data

US 2003/0079981 A1 May 1, 2003

Related U.S. Application Data

(62) Division of application No. 08/992,086, filed on Dec. 17, 1997, now Pat. No. 6,508,915.

(30) Foreign Application Priority Data

Dec. 20, 1996 (JP) .................................. 8-341770
Nov. 27, 1997 (JP) .................................. 9-326432

(51) Int. Cl.
  *B01D 3/42* (2006.01)
(52) U.S. Cl. ................. 202/155; 202/160; 202/172; 202/176; 202/181; 202/193; 202/196; 202/205; 422/105
(58) Field of Classification Search ............ 202/181, 202/193, 196, 160, 200, 155, 172, 176, 205; 159/94, DIG. 19; 423/390.1, 394.2, 522, 423/531, 582; 210/348; 422/3, 105
See application file for complete search history.

(56) References Cited

U.S. PATENT DOCUMENTS 3,489,649 A  1/1970 Weiss .................. 202/196
3,760,061 A * 9/1973 Hammond ............ 423/243.01
4,252,602 A  2/1981 Kreplar
4,342,625 A  8/1982 Dennison ............... 202/193

(Continued)

FOREIGN PATENT DOCUMENTS

JP        51-60680        5/1976

(Continued)

*Primary Examiner*—Virginia Manoharan
(74) *Attorney, Agent, or Firm*—Armstrong, Kratz, Quintos, Hanson & Brooks, LLP

(57) ABSTRACT

A distilling apparatus and method use a two step distillation and purification process for processing a waste liquid, such as an impure sulfuric acid solution, to form a highly concentrated sulfuric acid solution. First, the waste liquid is stored in a concentrating column, where it is heated. A condenser, which uses the waste liquid as a cooling medium, condenses the vapor generated by the heater. The condensed vapor is passed through a filter, which separates impurities out of the waste liquid, prior to feeding the waste liquid back into the concentrating column. Water is then removed from the waste liquid via a distilling process. The resulting concentrated liquid is then fed to a purifying column, where it is again heated, to remove residue, and condensed, resulting in a highly pure waste liquid. The liquid level and physical state of the waste liquid in both the concentrating column and the purifying column are monitored to insure that only an optimum amount of waste liquid for distillation is stored in each of the columns.

18 Claims, 9 Drawing Sheets

U.S. PATENT DOCUMENTS

| | | | |
|---|---|---|---|
| 4,344,826 A | 8/1982 | Smith | 203/2 |
| 4,364,797 A | 12/1982 | Beck et al. | 202/193 |
| 4,676,870 A * | 6/1987 | Stewart et al. | 159/17.1 |
| 4,792,078 A * | 12/1988 | Takahashi | 228/8 |
| 4,856,421 A * | 8/1989 | Whitford | 99/276 |
| 4,863,688 A * | 9/1989 | Schmidt et al. | 422/28 |
| 4,963,231 A | 10/1990 | Ryham | 203/49 |
| 4,985,118 A | 1/1991 | Kuremetso et al. | 159/47.3 |
| 5,032,218 A * | 7/1991 | Dobson | 203/40 |
| 5,061,348 A | 10/1991 | McCormick et al. | 203/12 |
| 5,174,864 A * | 12/1992 | Arbizzani et al. | 202/175 |
| 5,275,701 A | 1/1994 | Mazzatro et al. | 203/12 |
| 5,354,428 A | 10/1994 | Clark et al. | 202/2 |
| 5,368,698 A | 11/1994 | Field et al. | 202/193 |
| 5,443,695 A | 8/1995 | Yuan | 203/1 |
| 5,500,095 A * | 3/1996 | Shinagawa et al. | 203/2 |
| 5,535,877 A * | 7/1996 | Eastcott et al. | 203/18 |
| 5,570,154 A * | 10/1996 | Kurimoto et al. | 396/568 |
| 5,603,811 A | 2/1997 | Lucas et al. | 203/13 |
| 5,904,321 A * | 5/1999 | Cox et al. | 244/134 R |
| RE37,972 E * | 2/2003 | Clark et al. | 29/25.01 |
| 6,740,432 B1 * | 5/2004 | Shimanuki et al. | 429/13 |

FOREIGN PATENT DOCUMENTS

| | | |
|---|---|---|
| JP | 60-82102 | 5/1985 |
| JP | 61-239628 | 10/1986 |
| JP | 61-291407 | 12/1986 |
| JP | 62-41703 | 2/1987 |
| JP | 3-147323 | 6/1991 |
| JP | 6-127908 | 5/1994 |
| JP | 8-119608 A | 5/1996 |

* cited by examiner

APPARATUS AND METHOD FOR DISTILLING WASTE LIQUIDS

This application is a division of Ser. No. 08/992,086, filed Dec. 17, 1997, now U.S. Pat. No. 6,508,915.

BACKGROUND OF THE INVENTION

The present invention relates to a distilling apparatus for distilling and purifying waste liquids such as sulfuric acid employed for chemical treatment in processes for producing semiconductors, etc.

As semiconductor devices such as LCD (Liquid Crystal Display) are produced in increasing numbers, huge amounts of solutions, such as of sulfuric acid, are employed. To achieve distillatory purification of waste liquids employed in production processes efficiently and accurately reduces production costs and contributes to environmental conservation.

In a process of producing semiconductor devices, for example, in a step of cleaning wafers, a solution prepared by adding about 2% by weight (wt %) of hydrogen peroxide to about 97 wt % of a commercially available sulfuric acid and heated to 80 to 120° C. is employed. When the waste liquid left after use of the solution is to be recovered, the added hydrogen peroxide is partly converted into water, and also, water migrates into the solution. Accordingly, the concentration of the sulfuric acid in the waste liquid drops to 80 to 90 wt %. Further, impurities such as silicon, iron, sodium and organic materials are contained in the waste liquid. The recovered waste liquid is sold or recycled by subjecting it to distillatory purification under atmospheric pressure. FIG. 1 shows an example of a prior art sulfuric acid distilling apparatus for distilling and purifying a sulfuric acid waste liquid.

As shown in FIG. 1, the sulfuric acid distilling apparatus is equipped with a concentrating column 101 and a purifying column 102. A contact type liquid level sensor 103 is disposed in the concentrating column 101. A valve 104 is opened and closed based on detection results of the liquid level sensor 103 such that a fixed amount of sulfuric acid waste liquid may be in the concentrating column 101. The waste liquid supplied to the concentrating column 101 is heated by a heater 105 to a predetermined temperature required to achieve distillation (e.g., 300° C. under the atmospheric pressure). The water content formed by distillation is condensed by a condenser 106, stored in a tank 107, and discharged by opening a valve 108. Water is supplied as a cooling medium to the condenser 106. The sulfuric acid thus concentrated is supplied to the purifying column 102.

The concentrated sulfuric acid is heated to a predetermined temperature (about 300° C. under atmospheric pressure) by a second heater 109 provided in the purifying column 102, and thus a purified sulfuric acid solution is formed. The purified sulfuric acid solution is passed through a condenser 110, stored in a tank 111 and can be discharged by opening a valve 112. Water is supplied as a cooling medium to the condenser 110. The residue in the purifying column 102 left, after purification, is condensed by a condenser 113 and stored in a tank 114. The residue in the tank 114 is discharged by opening a valve 115.

It is important to control the liquid level such that the amount of sulfuric acid waste liquid in the concentrating column 101 is constant in order to carry out correct control of distillation in the concentrating column 101. However, in the concentrating column 101, when the solution is heated, the hydrogen peroxide contained in the solution is vaporized to form foams, and also a large amount of hydrogen peroxide is decomposed to form oxygen foams. Such foaming greatly changes the level of the sulfuric acid waste liquid. Accordingly, the liquid level sensor 103 may erroneously detect the liquid level, making it is very difficult to control the amount of solution in the concentrating column 101.

Further, since the sulfuric acid in the concentrating column 101 is heated to about 300° C. or higher, related parts in the concentrating column 101 should have sufficient resistance to high temperatures of 300° C. or higher. Further, when the concentrating column 101 is heated to a high temperature, leakage at junctions and damage of the junctions can be induced by heat shock.

Japanese Unexamined Patent Publication No. 61-291407 discloses a process in which hydrogen peroxide contained in a sulfuric acid waste liquid is removed before the waste liquid is treated. According to this process, hydrogen peroxide is preliminarily removed from the sulfuric acid waste liquid by adding a sulfurous acid gas in an amount equal to or more than the equivalent amount of hydrogen peroxide to effect a chemical reaction. This process can prevent oxidation of a membrane for filtering the sulfuric acid waste liquid by hydrogen peroxide. However, the sulfurous acid does not entirely react with the hydrogen peroxide, and can form a reaction product of sulfuric acid and sulfurous acid. The reaction product is present in the sulfuric acid waste liquid as an impurity. As a result, the state of the sulfuric acid waste liquid is changed to lower the sulfuric acid purification accuracy.

The present invention provides a distilling apparatus which facilitates control of the amount of waste liquid.

SUMMARY OF THE INVENTION

Briefly stated, the present invention provides a distilling apparatus including: a distiller which stores therein a solution to be treated and distills the solution to form a distillate; a liquid level detector disposed in the distiller which detects the liquid level of the to be treated solution; a state detector for detecting a physical state of the to be treated solution contained in the distiller; and a control unit for controlling the amount of to be treated solution stored in the distiller based on detection results of the liquid level detector and the state detector.

The present invention further provides a distilling apparatus for distilling a hydrogen peroxide-containing solution to be treated. The apparatus includes: a remover for removing a substantial part of the hydrogen peroxide from the to be treated solution; a distiller, connected to the remover, for storing therein the to be treated solution from which the hydrogen peroxide has been removed and distilling the solution to form a distillate; and a control unit for controlling the amount of to be treated solution stored in the distiller based on a liquid level of the to be treated solution in the distiller.

The present invention provides a method for distilling a solution to be treated. The method includes the steps of: storing the to be treated solution in a distiller; detecting a liquid level of the to be treated solution stored in the distiller with a liquid level detector disposed in the distiller; detecting a physical state of the to be treated solution in the distiller with a state detector; controlling the amount of to be treated solution to be supplied to the distiller based on the liquid level and physical state detection results; and heating the to be treated solution stored in the distiller to form a distillate.

The present invention further provides a method for distilling a hydrogen peroxide-containing solution to be treated. The method includes the steps of: removing a substantial part of the hydrogen peroxide from the to be treated solution; storing the to be treated solution from which hydrogen peroxide has been removed in a distiller; controlling the amount of to be treated solution supplied to the distiller based on a liquid level of the to be treated solution in the distiller; and heating the to be treated solution stored in the distiller to form a distillate.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
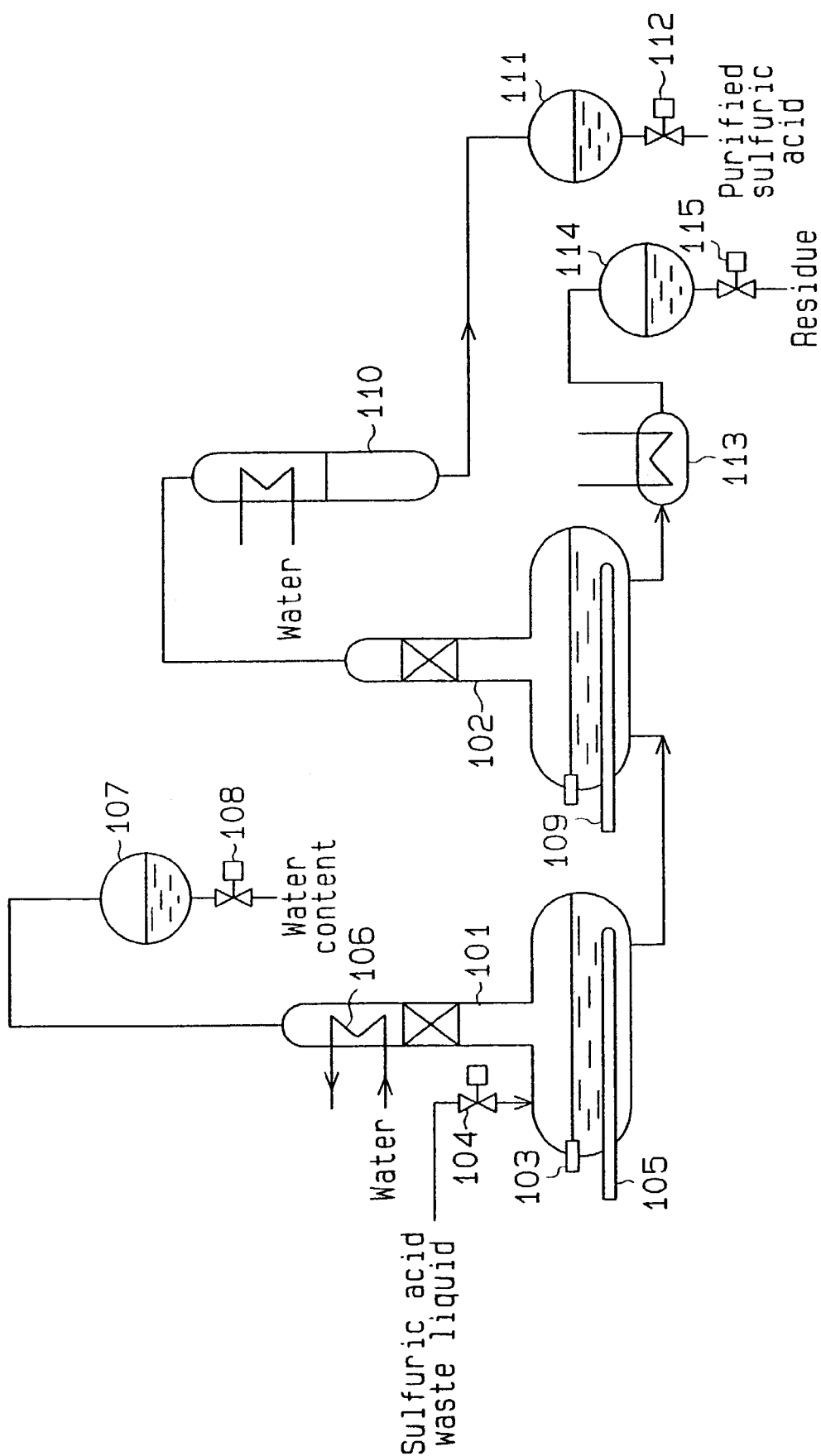
FIG. 1 is a schematic diagram of a prior art sulfuric acid distilling apparatus.

Certain terminology is used herein for convenience and is not meant to be construed narrowly or limiting. The word "substantial" generally means greater than half. The terminology includes the word above specifically mentioned, derivatives thereof and words similar import. In the drawings, like numerals indicate like elements throughout.

(First Embodiment)

Figure 2:
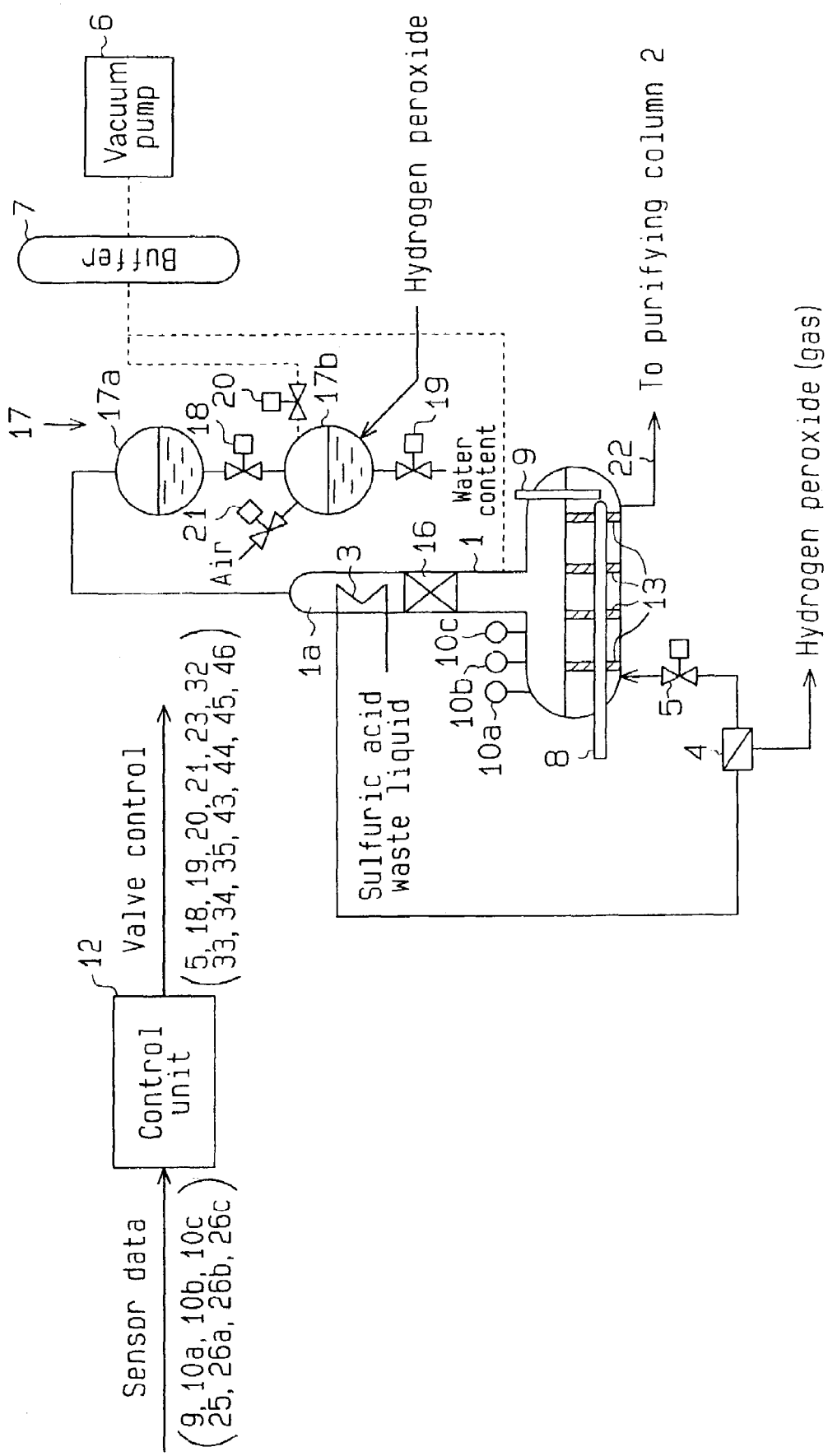
FIG. 2 is a schematic diagram of a distilling apparatus according to a first embodiment of the present invention.
Figure 3:
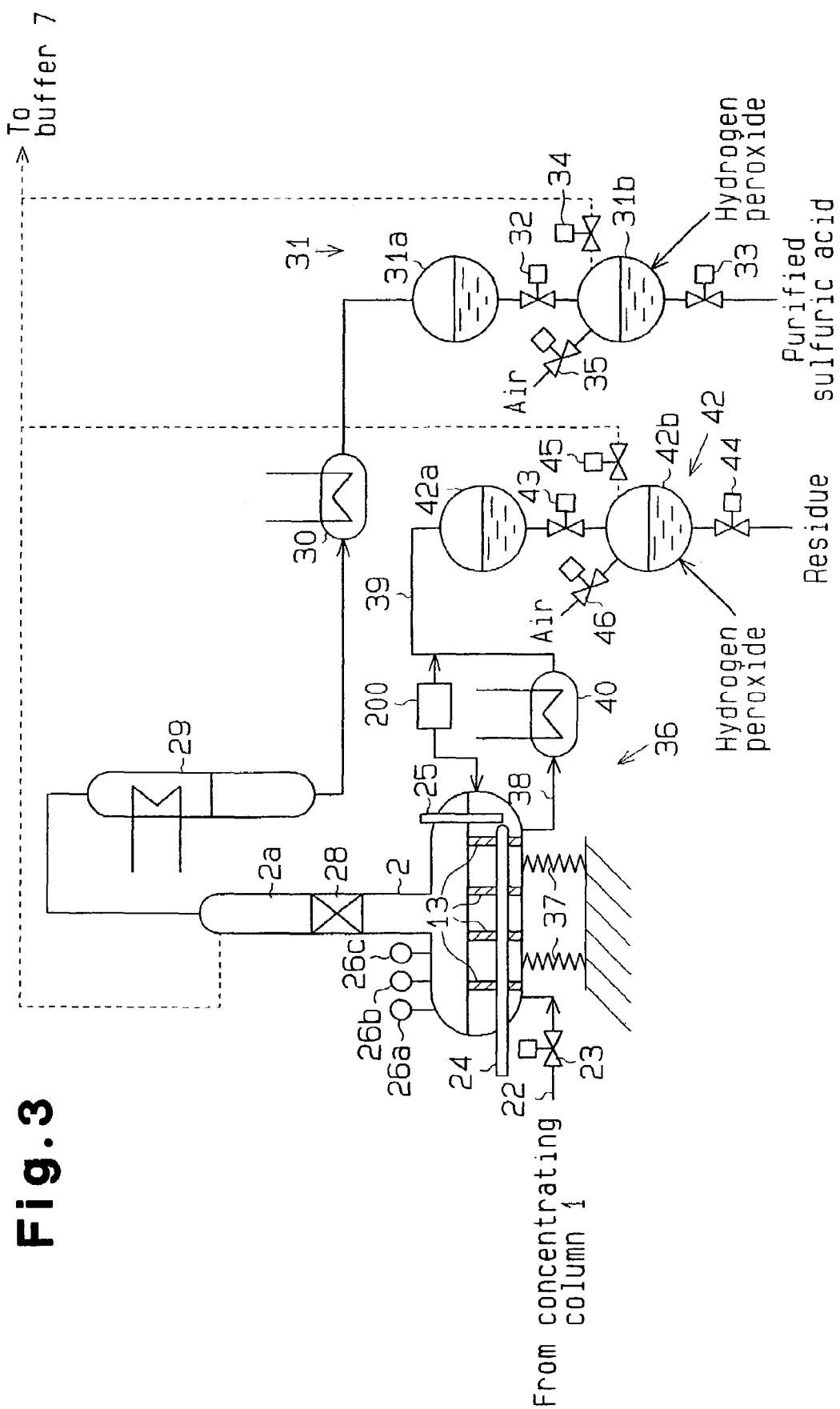
FIG. 3 is also a schematic diagram of the distilling apparatus according to the first embodiment of the present invention.

A distillatory purifying apparatus according to a first embodiment of the present invention will be described referring to the drawings. FIGS. 2 and 3 show schematic diagrams of the distillatory purifying apparatus. The distillatory purifying apparatus of the first embodiment, which includes a concentrating column 1 shown in FIG. 2 and a purifying column 2 shown in FIG. 3, carries out a two step distillatory purification process of a waste liquid, such as a sulfuric acid waste liquid.

As shown in FIG. 2, the concentrating column 1 has a column head 1a containing a condenser 3. A waste liquid, referred to herein as a sulfuric acid waste liquid, is supplied as a cooling medium (coolant) from a waste liquid tank (not shown) to the condenser 3. The sulfuric acid waste liquid is, for example, one employed in a step of cleaning semiconductor wafers, such as a sulfuric acid solution containing about 2% by weight (wt %) of aqueous hydrogen peroxide as an oxidizing agent, or a sulfuric acid waste liquid employed in an LCD production process may be supplied to the concentrating column 1.

The sulfuric acid waste liquid serves as a cooling medium for condensing the vapor in the concentrating column 1. Accordingly, the vapor in the concentrating column 1 is cooled by heat exchange with the sulfuric acid waste liquid, so that the waste liquid is heated to a predetermined temperature (e.g., 30 to 80° C.). When the sulfuric acid waste liquid is heated, the hydrogen peroxide contained therein is partly vaporized and partly decomposed into water and oxygen. If the condenser 3 is damaged, the cooling medium can migrate into the concentrating column 1. However, since the cooling medium according to the present invention is the sulfuric acid waste liquid, the sulfuric acid waste liquid in the concentrating column 1 does not react with the vapor.

The sulfuric acid waste liquid passed from the condenser 3 is supplied through a filter 4 and a supply valve 5 into the concentrating column 1. The filter 4 is a filter having a hydrophobic membrane, preferably a Teflon filter. The filter 4 separates the vaporized hydrogen peroxide and decomposition product oxygen from the sulfuric acid waste liquid (gas-liquid separation). Accordingly, the vaporized hydrogen peroxide and the decomposition product oxygen preliminarily removed from the sulfuric acid waste liquid supplied to the concentrating column 1. That is, in the first embodiment, no extra substance is added to remove hydrogen peroxide. Thus, no reaction product is formed, and the state of the sulfuric acid waste liquid remains unchanged, which maintains purification accuracy at a high level.

The hydrogen peroxide separated from the sulfuric acid waste liquid may be reacted with sulfur dioxide to form sulfuric acid, and the thus formed sulfuric acid may be added to the sulfuric acid waste liquid before it is subjected to distillation. In this case, the concentration of sulfuric acid in such untreated sulfuric acid waste liquid is increased to form a purified sulfuric acid with higher purity.

A water seal vacuum pump 6 is preferably connected to the concentrating column 1. However, other vacuum pumps, such as an oil-sealed rotary vacuum pump or a reciprocating pump may be used.

The vacuum pump 6 reduces the internal pressure of the concentrating column 1 to a predetermined level. In the first embodiment, the vacuum pump 6 is designed to reduce the internal pressure of the concentrating column 1 preferably to 50 Torr or less, and more preferably to about 5 to 20 Torr. A buffer 7 is interposed between the concentrating column 1 and the vacuum pump 6.

A heater 8 for heating the sulfuric acid waste liquid is disposed in the concentrating column 1. The heater 8, the external surface of which is preferably protected with quartz, is directly inserted laterally into the column 1, so as to increase the efficiency of heating the sulfuric acid waste liquid. The sulfuric acid waste liquid supplied to the concentrating column 1 contains no hydrogen peroxide, since it has been removed beforehand. Accordingly, the sulfuric acid waste liquid heated by the heater 8 is controlled so as not to undergo foaming. In other words, the sulfuric acid waste liquid is heated and distilled relatively mildly in the concentrating column 1.

Further, since the internal pressure of the concentrating column 1 is reduced by the vacuum pump 6, the boiling point of the sulfuric acid waste liquid is lower than under atmospheric pressure. For example, when the internal pressure of the concentrating column 1 is reduced to about 5 to 20 Torr, the boiling point of the sulfuric acid waste liquid is about 180 to 220° C. Accordingly, the sulfuric acid waste liquid is heated to a temperature (about 180 to 220° C.) which is lower than the temperature (300° C. or higher) to which it is heated under atmospheric pressure, which reduces the load of the heater 8. The sulfuric acid waste liquid is heated to 30 to 80° C. by heat exchange when it passes the condenser 106 and then supplied to the concentrating column 1. Accordingly, the heater 8 heats the pre-heated sulfuric acid waste liquid to 180 to 220° C., which further reduces the load of the heater 8. Further, there is no to employ parts having high-temperature resistance in the concentrating column 1. In addition, since rise in the temperature of the parts employed is controlled, the liability of leakage at junctions or damage of the junctions induced by heat shock is reduced.

The concentrating column 1 has a liquid level sensor 9, a temperature sensor 10a, a concentration sensor 10b and a specific gravity sensor 10c. The sensors 9 and 10a to 10c are connected to a control unit 12. The liquid level sensor 9 is preferably a continuous capacitance sensor which detects the level of the sulfuric acid waste liquid in the column 1. The temperature sensor 10a, concentration sensor 10b and specific gravity sensor 10c detect the temperature, concentration and specific gravity of the sulfuric acid waste liquid in the column 1, respectively.

The control unit 12 receives signals expressing detection results from the sensors 9 and 10a to 10c respectively, and calculates an optimum volume of sulfuric acid waste liquid for carrying out distillation, based on the detection results of the sensors, and finds a target capacitance value of the liquid level sensor 9, depending on the calculated optimum volume. The control unit 12 further controls opening and closing of the supply valve 5 so that the actual capacitance value of the liquid level sensor 9 substantially coincides with the target capacitance value when the sulfuric acid waste liquid is supplied into the concentrating column 1. The sulfuric acid waste liquid contains no hydrogen peroxide, as previously discussed, since it has been removed before the waste liquid is supplied to the concentrating column 1, so that the waste liquid undergoes less foaming during heating, and thus there is less induced vibration on the liquid surface. Therefore, the level of the sulfuric acid waste liquid can be detected accurately by the liquid level sensor 9. Thus, the level of the sulfuric acid waste liquid can be controlled accurately, depending on the temperature and pressure.

Figure 4A:
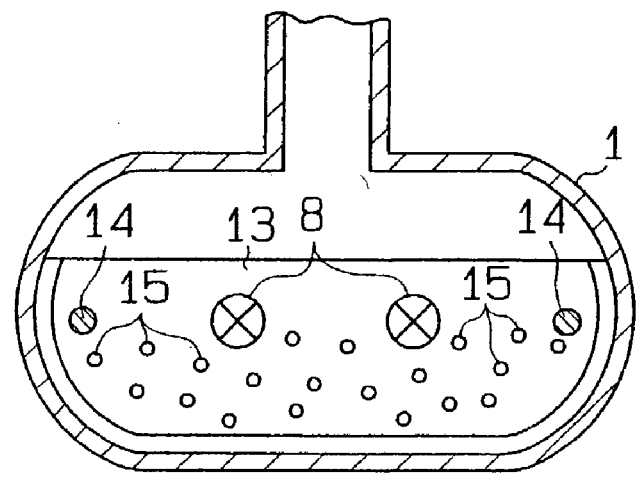
FIG. 4A is a schematic cross-sectional side view of a concentrating column of the apparatus of FIG. 2.
Figure 4B:
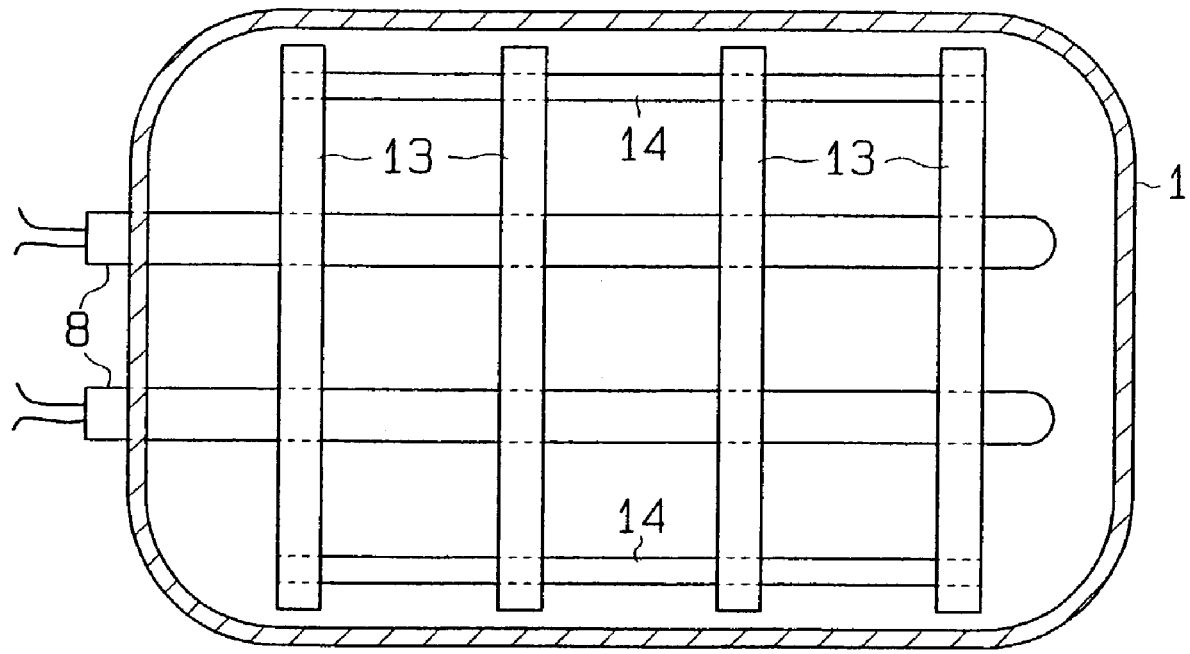
FIG. 4B is a horizontal cross-sectional view of the concentrating column of the apparatus of FIG. 2.

The concentrating column 1 contains partitions 13 for separating an inner space thereof. As shown in FIG. 4A, each partition 13 has side end faces conforming to the profile of the inner wall surface of the concentrating column 1 and an upper end face formed such that it is substantially at a maximum level of the sulfuric acid waste liquid supplied into the concentrating column 1. In the first embodiment, four partitions 13 are connected by two connecting parts 14, such that the partitions 13 are retained at equal intervals, as shown in FIG. 4B. The four partitions 13 divide the inner solution storing space of the concentrating column 1 into a plurality of spaces. Each partition 13 makes the sulfuric acid waste liquid present in one of the thus divided spaces difficult to flow into the other divided spaces. That is, vibration at the liquid surface in one divided space is not readily transmitted to the liquid surfaces in the other divided spaces. In other words, the partitions 13 serve as restricting plates for restricting migration of the sulfuric acid waste liquid, and thus reduce vibration at the liquid surface.

As shown in FIG. 4A, each partition 13 contains a plurality of pores 15. The pores 15 are preferably formed at a lower part of each partition 13. The pores 15 absorb foams formed when the sulfuric acid waste liquid is boiled. The pores 15 are effective for suppressing rippling of the sulfuric acid waste liquid and thus allow accurate detection of the liquid level.

As shown in FIG. 2, a cylindrical filler (rasching ring) 16 for cooling the vapor formed during distillation is disposed in the concentrating column 1. The vapor contains sulfuric acid vapor and water vapor. Since the boiling point of sulfuric acid vapor is higher than that of water vapor, the sulfuric acid vapor is liquefied to drop when it is cooled by the rasching ring 16. The water vapor passes the rasching ring 16 and is introduced to the condenser 3. The water vapor is condensed by the condenser 3, and the liquefied water content is stored in a receiving container 17. Thus, the concentration of sulfuric acid contained in the sulfuric acid waste liquid in the concentrating column 1 is increased.

The receiving container 17 contains a primary container 17a and a secondary container 17b. A primary discharge valve 18 is interposed between the containers 17a and 17b, and a secondary discharge valve 19 is disposed below the secondary container 17b. The secondary container 17b is connected via a vacuum valve 20 to the buffer 7. When the vacuum valve 20 is opened, the internal pressure of the secondary container 17b is reduced to the same predetermined level as the pressure in the concentrating column 1. The secondary container 17b contains an atmospheric pressure valve 21 for opening the inner space of the container 17b to the atmosphere.

The water content condensed by heat exchange by the condenser 3 is first stored in the primary container 17a of the receiving container 17 and then transferred to the secondary container 17b under opening and closing operation of the primary discharge valve 18. In this step, the vacuum valve 20 is opened, which reduces the internal pressure of the secondary container 17b. Accordingly, when the water content stored in the primary container 17a is transferred to the secondary container 17b, the internal pressure of the concentrating column 1 is maintained at a fixed level. Further, the buffer 7 absorbs pressure fluctuation occurring when the water content is transferred from the primary container 17a to the secondary container 17b. Accordingly, the internal pressure of the concentrating column 1 is maintained at a fixed level.

The water content stored in the secondary container 17b is discharged in the following order. First, the primary valve 18 and the vacuum valve 20 are closed. Next, the atmospheric pressure valve 21 is opened. Finally, the secondary discharge valve 19 is opened. Since the primary valve 18 is closed when the water content is discharged, the internal pressure of the concentrating column 1 is maintained at a fixed level. Further, since the inner space of the secondary container 17b is open to the atmosphere, the water content stored therein is speedily discharged.

As shown in FIGS. 2 and 3, the concentrating column 1 and the purifying column 2 are connected to each other via a connecting pipe 22 having a supply valve 23. When the sulfuric acid waste liquid is subjected to distillation in the concentrating column 1, the water content is evaporated to form a sulfuric acid solution (concentrated sulfuric acid) having a predetermined concentration (about 97 wt %). The sulfuric acid solution is transferred from the concentrating column 1 through the connecting pipe 22 to the purifying column 2 by opening the supply valve 23, due to the difference between the specific gravity of the liquid in the concentrating column 1 and that of the liquid in the purifying column 2.

The purifying column 2 is connected to the vacuum pump 6 via the buffer 7 and is maintained at a predetermined reduced pressure by the vacuum pump 6 and the buffer 7. The purifying column 2 has a heater 24 for heating the concentrated sulfuric acid. The heater 24, which is preferably protected on the external surface with quartz, is directly inserted laterally into the column 2.

Since the internal pressure of the purifying column 2 is reduced, the boiling point of the concentrated sulfuric acid is lower than the boiling point under atmospheric pressure. For example, when the internal pressure of the purifying column 2 is reduced to about 5 to 20 Torr, the boiling point of the sulfuric acid is lowered to about 180 to 220° C. Accordingly, the heater 24 heats the sulfuric acid to a temperature (about 180 to 220° C.) which is lower than the temperature (300° C. or higher) required under atmospheric pressure. This reduces the load of the heater 24.

The purifying column 2 has a liquid level sensor 25, a temperature sensor 26a, a concentration sensor 26b and a specific gravity sensor 26c, which are all connected to the control unit 12. The liquid level sensor 25 is preferably a continuous capacitance sensor which detects the level of the sulfuric acid in the column 2 and outputs a signal expressing the liquid level of the sulfuric acid solution. The temperature sensor 26a, concentration sensor 26b and specific gravity sensor 26c detect the temperature, concentration and specific gravity of the sulfuric acid waste liquid in the column 2 and output signals expressing related detection results, respectively.

The control unit 12 receives the signals from the sensors 25 and 26a to 26c and calculates an optimum volume of the sulfuric acid for carrying out purification and determines the target capacitance value of the liquid level sensor 25, depending on the calculated optimum volume. The control unit 12 controls opening and closing of the supply valve 23 so that the actual capacitance value of the liquid level sensor 25 substantially coincides with the target capacitance value, when the sulfuric acid is supplied into the concentrating column 2. Thus, the level of the sulfuric acid is controlled accurately depending on the temperature and pressure.

A rasching ring 28, as a filter for cooling the vapor (sulfuric acid gas), is disposed in the purifying column 2. The sulfuric acid vapor contains impurities, which deteriorate the quality of the purified sulfuric acid. The rasching ring 28 removes impurities from the sulfuric acid vapor by liquefying the sulfuric acid vapor partly, to drops. The greatest part of the vapor passes the rasching ring 28 and is introduced from the column head 2a to a condenser 29.

The sulfuric acid waste liquid which is not yet distilled is supplied as a cooling medium to the condenser 29. The sulfuric acid vapor undergoes heat exchange with the sulfuric acid waste liquid when the former passes the condenser 29. Thus, the sulfuric acid waste liquid is heated, while the sulfuric acid vapor is condensed to assume a liquid form. The sulfuric acid liquid is transferred to a second condenser 30 and condensed there. The untreated sulfuric acid waste liquid is also supplied as a cooling medium to the second condenser 30. The sulfuric acid liquid condensed by the second condenser 30 the waste liquid stored as a purified sulfuric acid in a receiving container 31.

Since the untreated sulfuric acid waste liquid is employed as a cooling medium for the condensers 29 and 30, it does not react with the purified sulfuric acid even if the condensers 29 and 30 are damaged and the waste liquid migrates into the purified acid in the receiving container 31.

The receiving container 31 includes a primary container 31a and a secondary container 31b. A primary discharge valve 32 is interposed between the containers 31a and 31b, and a secondary discharge valve 33 is connected to the secondary container 31b. The secondary container 31b is connected to the buffer 7. A vacuum valve 34 is interposed between the secondary container 31b and the buffer 7. When the vacuum valve 34 is opened, the internal pressure of the secondary container 31b is reduced to the same predetermined level as the pressure in the purifying column 2. The secondary container 31b contains an atmospheric pressure valve 35 for opening an inner space of the container 31b to the atmosphere.

The purified sulfuric acid condensed by the condensers 29 and 30 is first stored in the primary container 31a of the receiving container 31 and then transferred to the secondary container 31b by opening the primary discharge valve 32. When the purified sulfuric acid is transferred, the vacuum valve 34 is opened, so that the internal pressure of the secondary container 31b is reduced. Accordingly, the internal pressure of the purifying column 2 is maintained at a fixed level, when the purified sulfuric acid stored in the primary container 31a is transferred to the secondary container 31b. Further, the buffer 7 absorbs pressure fluctuation occurring when the purified sulfuric acid is transferred from the primary container 31a to the secondary container 31b. Thus, the internal pressure of the purifying column 2 is maintained at a fixed level.

The purified sulfuric acid stored in the secondary container 31b is discharged in the following order. First, the primary valve 32 and the vacuum valve 34 are closed. Next, the atmospheric pressure valve 35 is opened to open the inner space of the secondary container 31b to the atmosphere. Finally, the secondary discharge valve 33 is opened to discharge the purified sulfuric acid. Since the primary discharge valve 32 is closed when the purified sulfuric acid is discharged, the internal pressure of the purifying column 2 is maintained at a fixed level. Further, since the inner space of the secondary container 31b is open to the atmosphere, the purified sulfuric acid stored therein is discharged speedily.

The purifying column 2 is provided with a metering discharge mechanism 36 which adjusts the amount of residue-containing liquid (concentrated solution) discharged from the purifying column 2 so as to maintain high purity of the sulfuric acid in the purifying column 2. The residue contains impurities. The metering discharge mechanism 36 increases the discharge amount of concentrated sulfuric acid when the specific gravity of the liquid in the purifying column 2 is high and decreases the discharge amount when the specific gravity thereof is low. Thus, the residue is discharged at a predetermined ratio relative to the purified sulfuric acid discharged from the secondary container 31b. In the first embodiment, the residue is discharged in an amount of about 10% relative to the purified sulfuric acid.

The metering discharge mechanism 36 includes a resilient body 37 for urging the purifying column 2 upward, a discharge pipe 38 connected to the purifying column 2 and a discharge pipe 39 connected to the discharge pipe 38. A condenser 40 for condensing the residue is interposed between the discharge pipe 38 and the discharge pipe 39.

The resilient body 37 preferably includes springs disposed under the purifying column 2 which support the column 2. Under the action of the springs, the purifying column 2 sinks when the concentration of the residue is increased (when the specific gravity of the liquid in the purifying column 2 is high), while it rises when the concentration of the residue is reduced (when the specific gravity thereof is low). That is, the purifying column 2 floats up and down depending on the weight of the purifying column 2 and the weight of the liquid (sulfuric acid and residue) present therein. The discharge pipe 38 also preferably floats up and down together with the purifying column 2, and the liquid discharged from the purifying column 2 flows through the pipe 38 toward the discharge pipe 39.

Figure 5A:
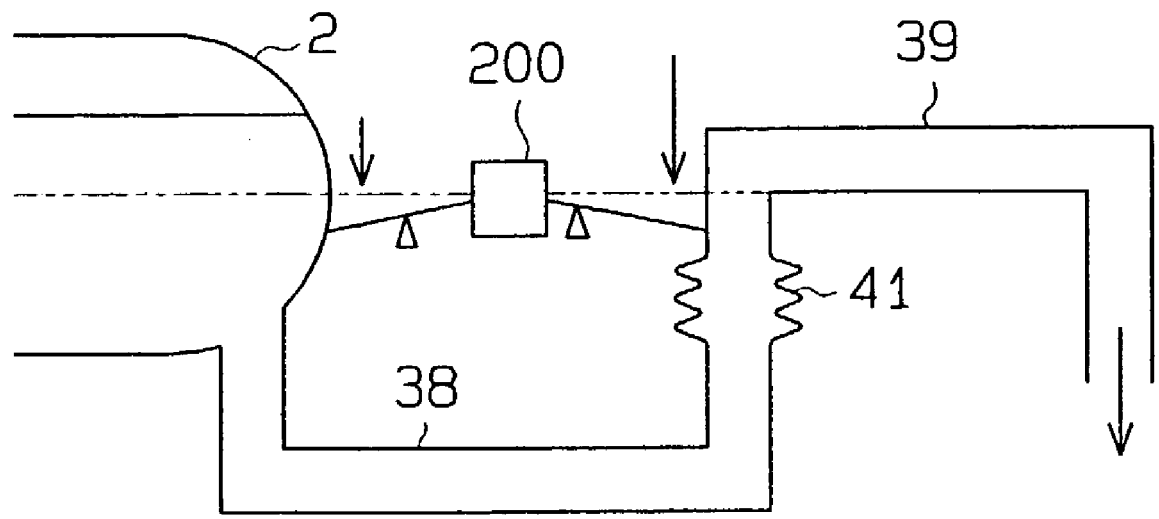
FIGS. 5A and 5B are schematic diagrams showing actions of the purifying column of FIG. 3.

The discharge pipe 39 is connected by a control mechanism 200 which causes the discharge pipe 39 to move up and down in accordance with the up and down floating of the purifying column 2. Accordingly, the control mechanism 200 causes the discharge pipe 39 to move down when the purifying column 2 moves down and to move up when the purifying column 2 moves up, so that the portion of the liquid which is higher than the discharge pipe 39 is discharged through the discharge pipes 38, 39. That is, the control mechanism 200 controls the position of the discharge pipe 39 in accordance with the up and down floating of the entire purifying column 2. The residue is discharged at a predetermined ratio. The control mechanism 200 is implemented by applying, for example, a principle of lever. For example, when the concentration of the residue (impurities) in the liquid sulfuric acid is high, as shown in FIG. 5A, the purifying column 2 sinks (downward in FIG. 5A) against the urging force of the resilient body 37. Then, the control mechanism 200 moves down the discharge pipe 39 with the downward movement of the purifying column 2. Thus, the liquid level becomes higher than the fixed position (as indicated by the dash-dotted line in FIG. 5A) of the discharge pipe 39. Consequently, a large amount of liquid is discharged through the discharge pipe 39.

Figure 5B:
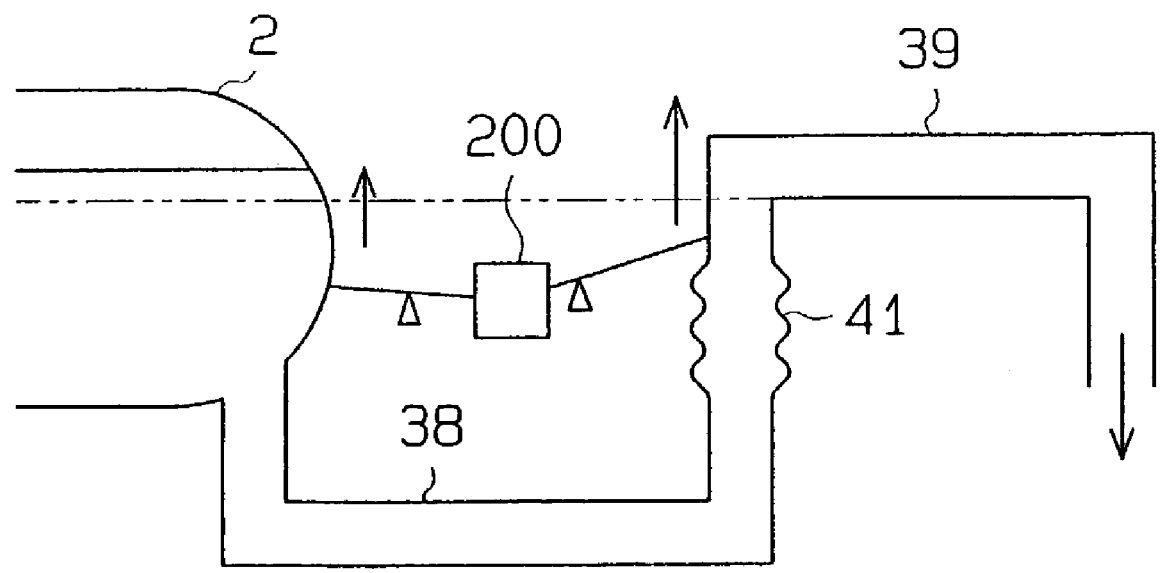

Meanwhile, when the concentration of the residue in the sulfuric acid is low, as shown in FIG. 5B, the purifying column 2 moves up (upward in FIG. 5B) by the urging force of the resilient body 37. Then, the control mechanism 200 moves up the discharge pipe 39 with the upward movement of the purifying column 2. Thus, the liquid level becomes slightly higher than the fixed position (as indicated by the dash-dotted line in FIG. 5B) of the discharge pipe 39. Consequently, a small amount of liquid is discharged through the discharge pipe 39. As shown in FIGS. 5A and 5B, the discharge pipe 38 and the discharge pipe 39 are connected by a flexible pipe 41. In FIGS. 5A and 5B, the condenser 40, shown in FIG. 3, is omitted.

As shown in FIG. 3, the residue-containing concentrated sulfuric acid discharged from the purifying column 2 is stored in a receiving container 42. The receiving container 42 includes a primary container 42a and a secondary container 42b. A primary discharge valve 43 is interposed between the containers 42a and 42b and a secondary discharge valve 44 is connected to the secondary container 42b. The secondary container 42b is connected to the buffer 7. A vacuum valve 45 is interposed between the secondary container 42b and the buffer 7. When the vacuum valve 45 is opened, the internal pressure of the secondary container 42b is reduced to the same predetermined level as in the purifying column 2. The secondary container 42b contains an atmospheric pressure valve 46 for opening the inner space of the container 42b to the atmosphere.

The residue-containing concentrated sulfuric acid condensed by the condenser 40 is first stored in the primary container 42a and then transferred to the secondary container 42b by opening the primary discharge valve 43. When the residue-containing sulfuric acid is transferred, the vacuum valve 45 is opened, so that the internal pressure of the purifying column 2 is maintained at a fixed level. Further, the buffer 7 of the vacuum system absorbs pressure fluctuation occurring when the residue-containing sulfuric acid is transferred from the primary container 42a to the secondary container 42b.

The residue-containing sulfuric acid is discharged from the secondary container 42b in the following order. First, the primary valve 43 and the vacuum valve 45 are closed. Next, the atmospheric pressure valve 46 is opened, to open the inner space of the secondary container 42b to the atmosphere. Finally, the secondary discharge valve 44 is opened to discharge the residue-containing sulfuric acid. Since the primary discharge valve 43 is closed when the residue-containing sulfuric acid is discharged, the internal pressure of the purifying column 2 is maintained at a fixed level. Further, since the inner space of the secondary container 42b is open to the atmosphere, the residue-containing sulfuric acid is discharged speedily.

In the first embodiment, the hydrogen peroxide separated beforehand from the sulfuric acid waste liquid may be bubbled through the liquid containing water, residues, etc., stored in the secondary container 17b, 31b or 42b. The liquid stored in the secondary container 17b, 31b or 42b contains a large amount of sulfur dioxide which reacts with hydrogen peroxide to form sulfuric acid. As a result, the hydrogen peroxide separated can be utilized effectively to control discharge of harmful sulfur dioxide.

(Second Embodiment)

Figure 6:
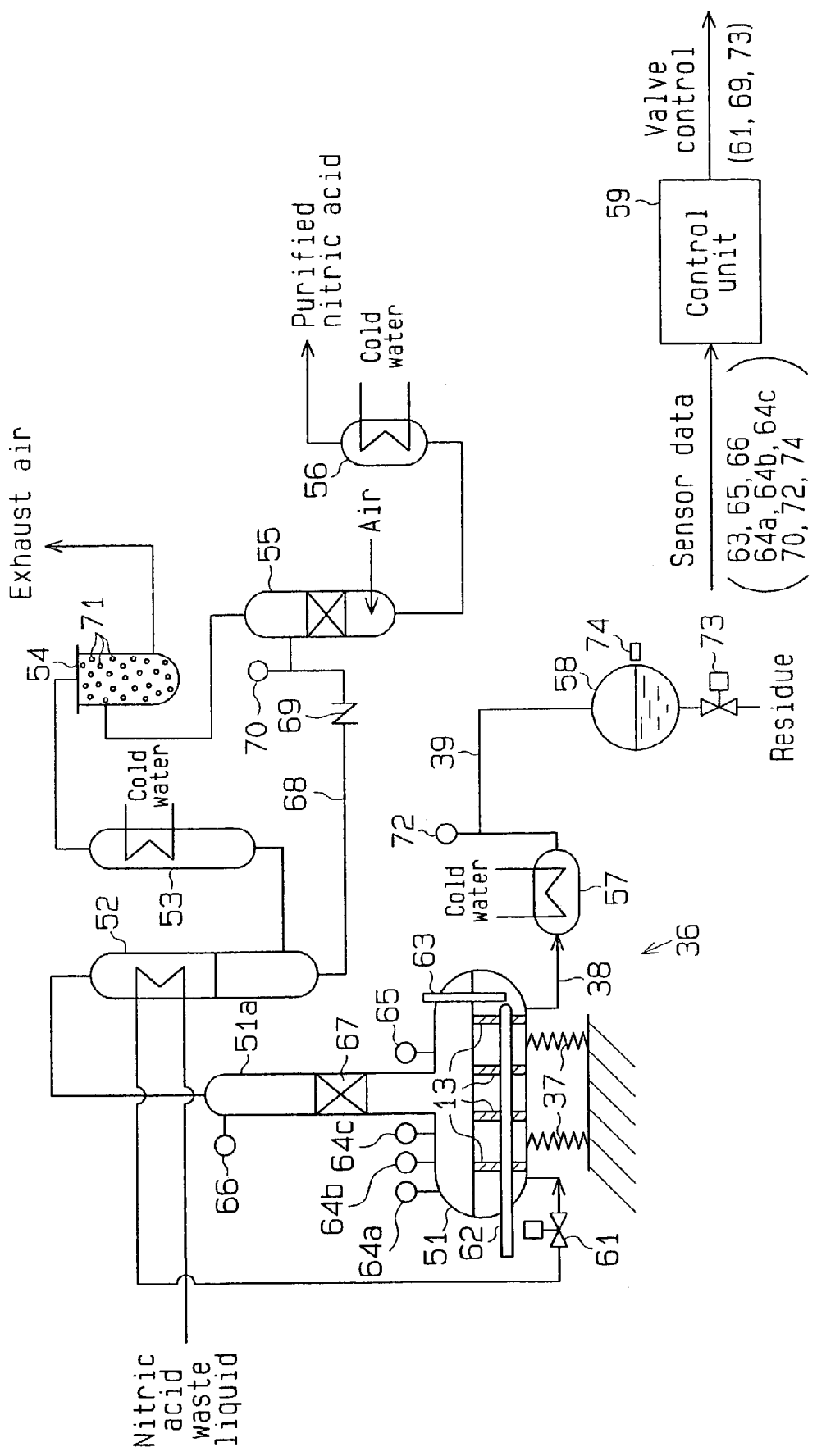
FIG. 6 is a schematic diagram of a distilling apparatus according to a second embodiment of the present invention.

Next, a distillatory purifying apparatus according to a second embodiment of the invention will be described. FIG. 6 shows a schematic diagram of a distillatory purifying apparatus for distilling and purifying a waste liquid, such as nitric acid. The distillatory purifying apparatus contains a purifying column 51, a first cooler 52, a second cooler 53, an exhaust chamber 54, a denitrating column 55, a product cooler 56, a waste acid cooler 57, a receiving container 58 and a control unit 59. The control unit 59 performs various controls in the distilling treatment of the nitric acid waste liquid.

In the second embodiment, the nitric acid waste liquid is distilled and purified in the purifying column 51 to form a purified nitric acid. More specifically, the purifying column 51 has both the function of the concentrating column 1 shown in FIG. 2 and the function of the purifying column 2 shown in FIG. 3. A purified nitric acid having the desired concentration cannot sometimes be formed by the treatment in the purifying column 51 only, depending on the concentration of the nitric acid waste liquid. In this case, the concentrating column 1 shown in FIG. 2 is employed to concentrate the nitric acid waste liquid to supply the resulting concentrated nitric acid to the purifying column 51. Thus, a purified nitric acid having the desired concentration can be obtained. Since the nitric acid waste liquid has a low boiling point under atmospheric pressure, the requirement of reducing the internal pressure of the purifying column 51 is not necessary.

The nitric acid waste liquid is supplied as a cooling medium (coolant) from a waste liquid tank (not shown) to the first cooler 52. The nitric acid waste liquid is subjected to heat exchange with the vapor in the first cooler 52. Thus, the vapor in the first cooler 52 is condensed, and the nitric acid waste liquid is heated to a predetermined temperature (e.g., about 30 to about 80° C.).

The thus heated nitric acid waste liquid is supplied through a supply valve 61 to the purifying column 51. A heater 62 for heating and preferably boiling the nitric acid waste liquid is disposed in the purifying column 51. The heater 62, the external surface of which is preferably protected, such as with quartz, is directly inserted laterally into the column 51, so as to enhance the efficiency of heating the nitric acid waste liquid. The heater 62 may heat the nitric acid waste liquid, preheated to 30 to 80° C. by heat exchange, to about 100 to about 120° C. The preheating via heat exchange reduces the load of the heater 62.

The purifying column 51 has a liquid level sensor 63, a temperature sensor 64a, a concentration sensor 64b and a specific gravity sensor 64c, which are connected to the control unit 59. The liquid level sensor 63 is preferably a continuous capacitance sensor which outputs a signal expressing the level of the nitric acid waste liquid in the purifying column 51. The temperature sensor 64a, concentration sensor 64b and specific gravity sensor 64c output signals expressing the temperature, concentration and specific gravity of the nitric acid waste liquid in the purifying column 51, respectively.

The control unit 59 receives the sensor signals from the sensors 63 and 64a to 64c to recognize the state of the nitric acid waste liquid in the purifying column 51. The control unit 59 calculates an optimum volume of the nitric acid waste liquid for carrying out concentration and purification based on the detection results of the sensors and determines the target value of the level of the nitric acid waste liquid in the purifying column 51, based on the calculated volume optimum. The control unit 59 controls opening and closing of the supply valve 61 so that the liquid level in the purifying column 51 coincides with the determined target value, when the nitric acid waste liquid is supplied into the concentrating column 51. The liquid level in the purifying column 51 can be controlled accurately by the control unit 59, depending on the conditions, such as temperature.

The purifying column 51 is connected to the control unit 59 and includes a pressure sensor 65 which outputs a signal expressing the internal pressure of the purifying column 51. The control unit 59 receives the pressure sensor signal to monitor the internal pressure of the purifying column 51. The control unit 59, upon recognition of an abrupt rise in the internal pressure of the purifying column 51, judges that some abnormality has occurred in the distillatory purifying apparatus and behaves to stop operation of the apparatus.

The purifying column 51 has a second temperature sensor 66 disposed in the column head 51a thereof. The second temperature sensor 66 is connected to the control unit 59 and outputs a signal expressing the internal temperature of the column head 51a. The control unit 59 receives the temperature signal from the temperature sensor 66 to monitor the temperature at the column head 51a. The control unit 59 adjusts the flow rate of the nitric acid waste liquid supplied to the first cooler 52 such that the temperature at the column head 51a is generally constant.

The purifying column 51 contains a plurality of partitions 13 which are essentially the same as the partitions in the first embodiment. Since the partitions 13 have already been described in the first embodiment, a detailed description herein is omitted. As before, each partition 13 contains a plurality of pores 15 formed therethrough (see FIG. 4A).

The vapor (nitric acid gas) in the purifying column 51 is cooled by a filler 67 disposed therein and then introduced from the column head 51a to the first cooler 52, where the nitric acid gas undergoes heat exchange with the untreated nitric acid waste liquid serving as a cooling medium. Thus, the nitric acid waste liquid is heated, and the nitric acid gas is condensed to assume a liquid form, i.e., into a purified nitric acid. The purified nitric acid is introduced through a pipe 68 to the denitrating column 55. The pipe 68 is provided with a check valve 69 for preventing back flow of the purified nitric acid from the denitrating column 55 to the first cooler 52.

The purified nitric acid in the denitrating column 55 reacts with air supplied thereto and is converted from a brown liquid to a colorless transparent liquid. The transparent purified nitric acid thus formed is supplied to the product cooler 56, where it is cooled by cold water and stored in a product container (not shown).

The pipe 68 is provided with a temperature sensor 70 connected to the control unit 59 which outputs a signal expressing the temperature of the purified nitric acid flowing through the pipe 68. The control unit 59 receives the signal from the temperature sensor 70 and monitors the temperature of the purified nitric acid in the denitrating column 55. The control unit 59 adjusts the amount of air supplied to the denitrating column 55 depending on the temperature of the purified nitric acid.

A gas containing $NO_x$ (nitric acid mist) is formed in the first cooler 52. The gas is cooled by cold water supplied to the second cooler 53 and then the gas is introduced to the exhaust chamber 54 to which the air containing $NO_x$ (nitric acid mist) formed by the reaction between air and nitric acid in the denitrating column 55 is introduced.

The exhaust chamber 54 is packed with a catalyst 71 for removing $NO_x$. The catalyst 71 adsorbs $NO_x$ contained in the gas introduced to the exhaust chamber 54 so that a purified gas is exhausted from the exhaust chamber 54.

The purifying column 51 is provided with the same metering discharge mechanism 36 as in the first embodiment. The metering discharge mechanism 36 adjusts the amount of residue-containing liquid such that residue may be discharged from the purifying column 51 at a predetermined ratio relative to the purified nitric acid. Since the metering discharge mechanism 36 has already been described in the first embodiment, further description is omitted. The discharge pipe 38 is provided with the waste acid cooler 57 for cooling the nitric acid waste liquid to be discharged.

A temperature sensor 72 is provided in the route of discharging the nitric acid waste liquid, preferably on the discharge pipe 39. The temperature sensor 72 is connected to the control unit 59 and outputs a signal expressing the temperature of the nitric acid waste liquid. The control unit 59 receives the signal from the temperature sensor 72 and monitors the temperature of the nitric acid waste liquid discharged from the purifying column 51. The control unit 59 recognizes an occurrence of some abnormality in the distillatory purifying apparatus when the temperature of the waste acid exceeds a predetermined temperature and behaves to stop operation of the apparatus.

The nitric acid waste liquid discharged is stored in the receiving container 58. The receiving container 58 is connected to piping having a discharge valve 73. The receiving container 58 is provided with a liquid level sensor 74 which is connected to the control unit 59 and outputs a signal expressing the level of the nitric acid waste liquid stored in the receiving container 58. More specifically, the liquid level sensor 74 is a capacitive sensor and is fixed at a predetermined height. The liquid level sensor 74 is designed such that its capacity may change depending on the level of the nitric acid waste liquid. The control unit 59 receives the signal from the liquid level sensor 74 and monitors the amount of nitric acid waste liquid stored in the receiving container 58. The control unit 59 opens the discharge valve 73 discharges the nitric acid waste liquid when the amount of nitric acid waste liquid reaches a predetermined level (e.g., the position where the liquid level sensor 74 is attached). The control unit 59 counts the frequency that the nitric acid waste liquid has reached the predetermined level in response to the signals from the liquid level sensor 74. The amount of nitric acid waste liquid stored in the receiving container 58 is determined depending on the position where the liquid level sensor 74 is attached. The control unit 59 monitors the discharge amount of nitric acid waste liquid based on the count.

In the second embodiment, the filter 4 as employed in the first embodiment is interposed between the first cooler 52 and the supply valve 61. The filter 4 enables treatment of a nitric acid waste liquid containing hydrogen peroxide. The hydrogen peroxide contained in the nitric acid waste liquid is heated by heat exchange in the first cooler 52 and vaporized. The filter 4 separates the vaporized hydrogen peroxide from the nitric acid waste liquid.

It should be apparent to those skilled in the art that the present invention may be embodied in many other specific forms without departing from the spirit or scope of the invention. Particularly, it should be understood that the invention may be embodied in the following forms.

Figure 7A:
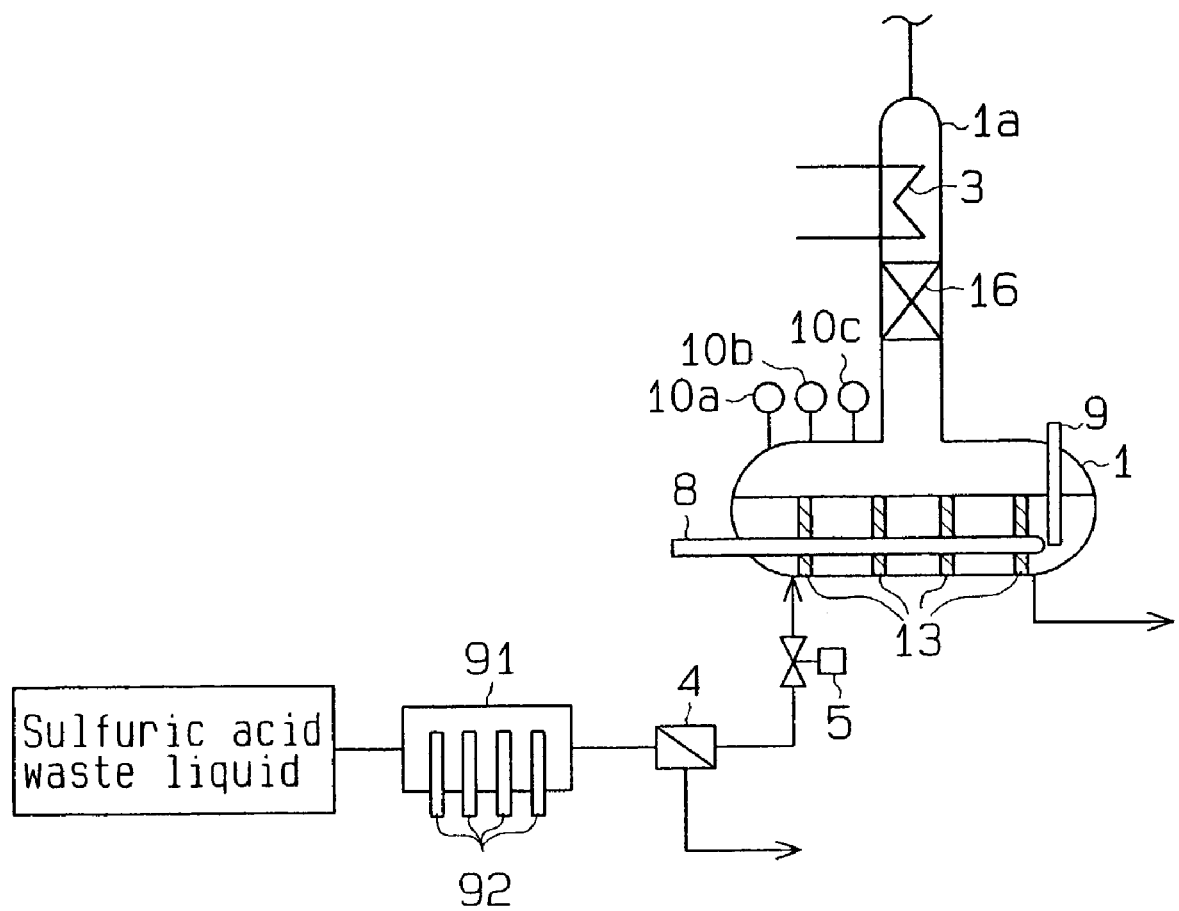
FIGS. 7A and 7B are partial schematic diagram of third distilling apparatus.
Figure 7B:
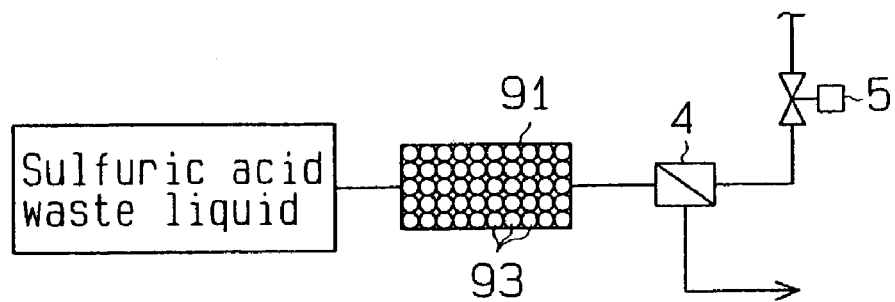

As shown in FIGS. 7A and 7B, a cylindrical container 91 containing a catalyst 92 (FIG. 7A) or 93 (FIG. 7B) may be interposed between a sulfuric acid waste liquid tank and the filter 4. The catalyst 92 or 93 decomposes hydrogen peroxide into oxygen and water, and the filter 4 separates the oxygen from the hydrogen peroxide. As the catalyst, a metal having low reactivity with sulfuric acid, for example, gold or platinum is preferably employed. The catalyst 92 or 93 preferably has a granular form, bar-like form, etc. FIG. 7A shows an example where bars, such as of gold or platinum, are employed as the catalyst 92. It is preferred to use as the catalyst 92 platinum which is employed as electrodes. FIG. 7B shows an example where a granular catalyst, such as gold or platinum, is employed as the catalyst 93. The catalyst 93 is highly reactive with hydrogen peroxide to facilitate decomposition of hydrogen peroxide, advantageously.

Figure 8:
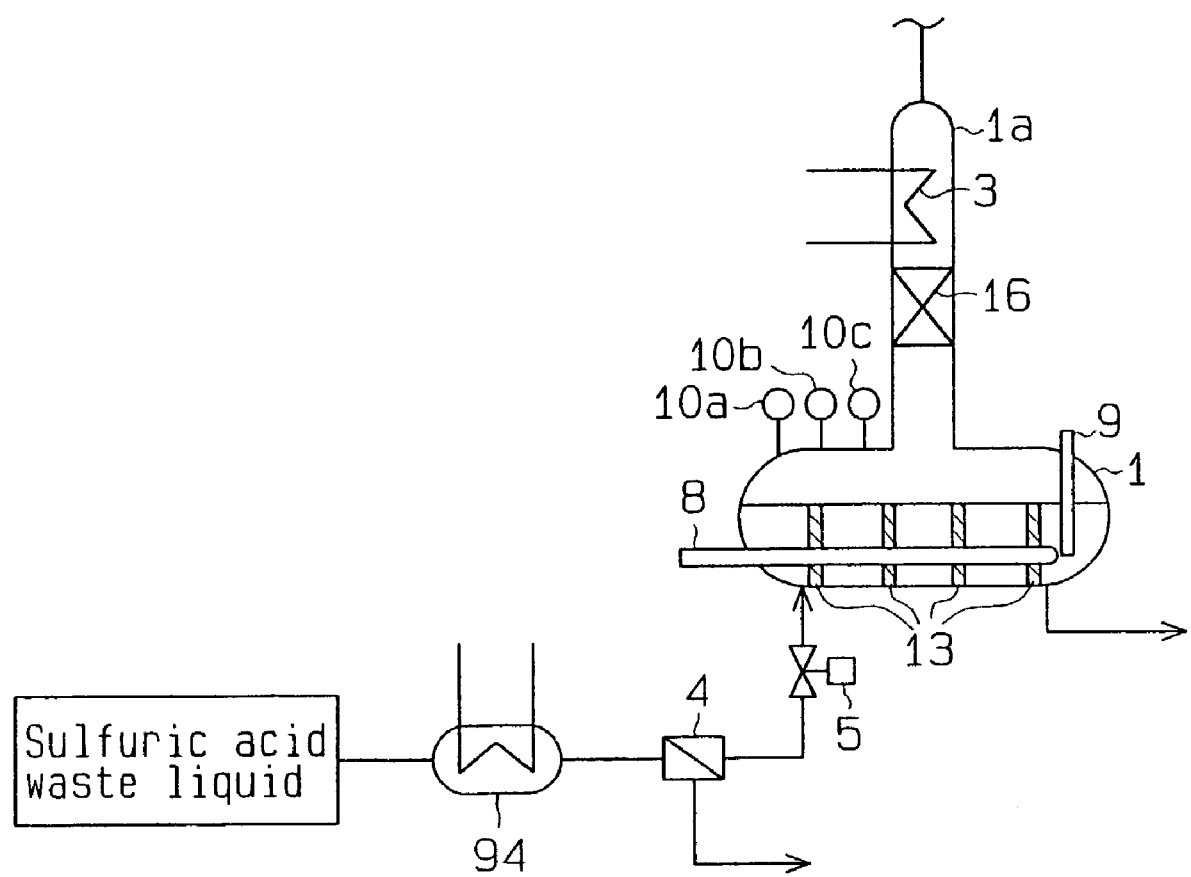
FIG. 8 is a partial schematic diagram of fourth distilling apparatus.

As shown in FIG. 8, a condenser 94 may be interposed between the waste liquid tank and the filter 4 to heat the sulfuric acid waste liquid and remove hydrogen peroxide, prior to distillation treatment. As a heating medium supplied to the condenser 94, a warm water is preferably used. The sulfuric acid waste liquid may be heated, for example, utilizing the heat of reaction between the water content stored in the secondary container 17b or 31b with the purified sulfuric acid. The water content is preferably supplied by the water seal vacuum pump 6. Such supply of water content reduces the amount of coolant employed.

Figure 9:
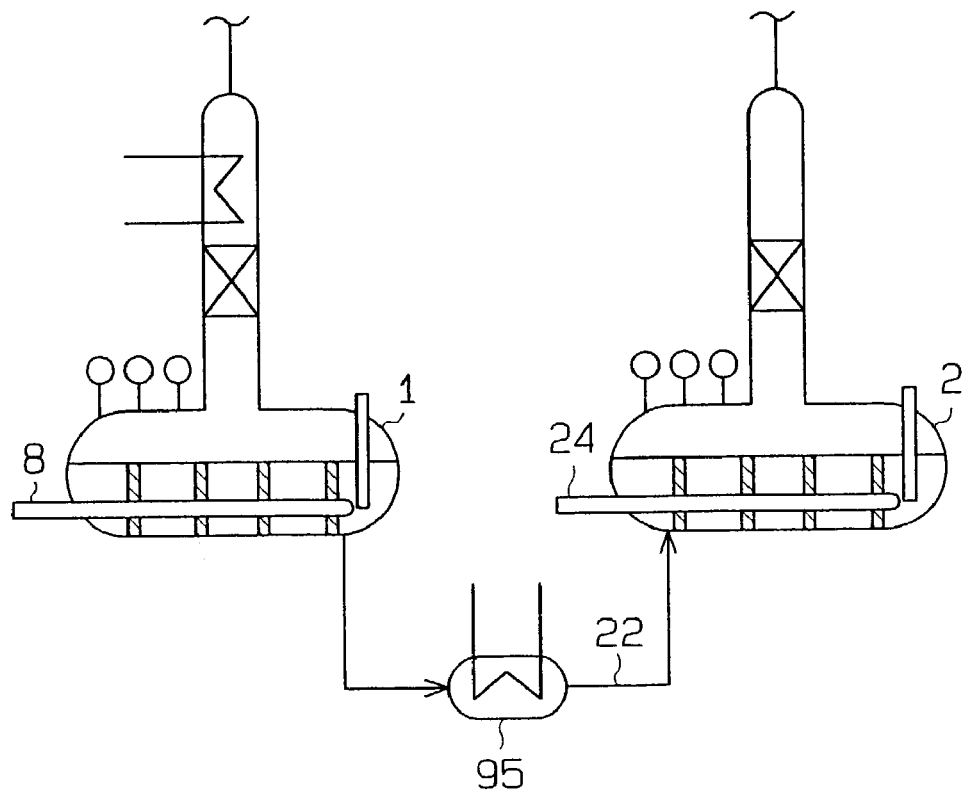
FIG. 9 is a partial schematic diagram of fifth distilling apparatus.

As shown in FIG. 9, a condenser 95 may be provided on the pipe 22 connecting the concentrating column 1 and the purifying column 2. When a heating medium is supplied to the condenser 95, the concentrated sulfuric acid flowing through the pipe 22 is heated. Since the temperature of the sulfuric acid is increased by the condenser 95, the load of the heater in the concentrating column 1 can be reduced. The mixture and the purified sulfuric acid employed as the heating medium may be returned to the tank. In this case, the concentration of sulfuric acid in the untreated sulfuric acid waste liquid is increased, so that a purified sulfuric acid having a high purity is obtained.

Figure 10:
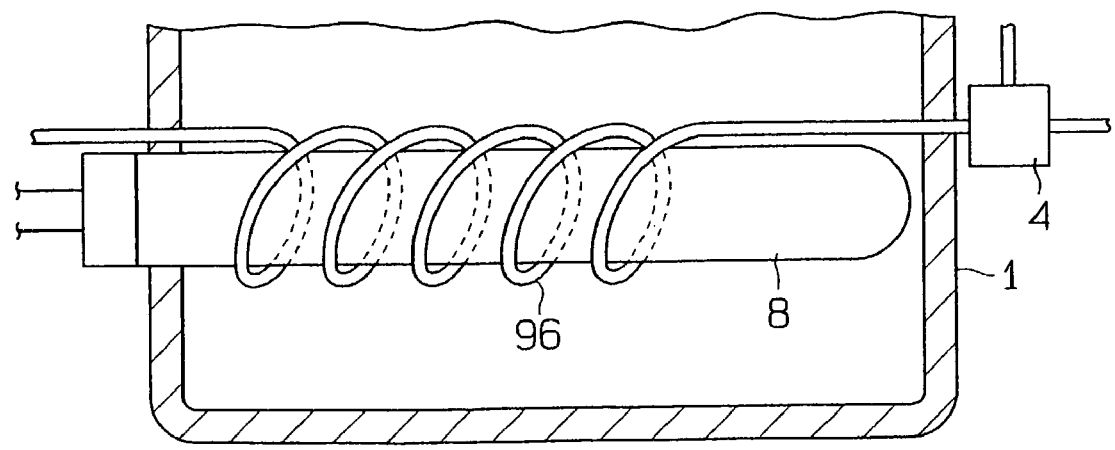
FIG. 10 is a partial schematic diagram of sixth distilling apparatus.

A piping may be inserted to the concentrating column 1, purifying column 2 or purifying column 51 so that the untreated sulfuric acid waste liquid (or untreated nitric acid waste liquid) may flow therethrough. The untreated sulfuric acid (or nitric acid) waste liquid is heated when it flows through the piping, and hydrogen peroxide contained therein is removed. As shown in FIG. 10, piping 96 may be wound around the heater 8, 24 or 62. The piping 96 allows the sulfuric acid waste liquid flowing therethrough to be efficiently heated by the heater 8.

The resilient body 37 may be disposed above the purifying column 2 or 51 with the column being suspended therefrom. Further or additional, resilient bodies 37 may also be disposed above and under the purifying column 2 or 51, so that the purifying column 2 or 51 may be urged upward.

The filter 4 having a hydrophobic membrane may be replaced with a separator such as a chamber.

Therefore, the present examples and embodiments are to be considered as illustrative and not restrictive, and the invention is not to be limited to the details given herein, but may be modified within the scope and equivalence of the appended claims.

What is claimed is:

1. A distilling apparatus comprising:
   a distiller which stores therein a solution to be treated and distills the solution to form a distillate, wherein the distiller includes a cooler for cooling a distillation gas formed by heating the to be treated solution in the distiller, and wherein the distiller includes a plurality of partitions retained in the distiller at equal intervals, each of the plurality of partitions having a plurality of pores;
   a liquid level detector disposed in the distiller which detects the liquid level of the to be treated solution;
   a state detector for detecting a physical state of the to be treated solution contained in the distiller, wherein state detector includes a temperature sensor, a concentration sensor, and a specific gravity sensor; and
   a control unit for setting a target liquid level of the liquid level detector based on detection result of the liquid level detector and the state detector and controlling a supply amount of to be treated solution stored in the distiller so that an actual liquid level coincides with the target liquid level, wherein the to be treated solution is provided to the cooler as a cooling medium, before the solution is supplied to the distiller.

2. The apparatus according to claim 1,
   the apparatus further comprising a supply passage connected to the cooler for passing the to be treated solution to the cooler as a cooling medium, before the solution is supplied to the distiller.

3. The apparatus according to claim 1, wherein a concentrated solution containing a residue is stored in the distiller;
   the apparatus further comprising a metering discharge mechanism for adjusting a discharge amount of the concentrated solution so that the residue is discharged from the distiller at a predetermined ratio relative to a distillate.

4. The apparatus according to claim 1, wherein the to be treated solution contains sulfuric acid, and the distiller includes a concentrating column to distill the to be treated solution to form a high concentrated sulfuric acid solution.

5. The apparatus according to claim 1, further comprising a vacuum pump for reducing an internal pressure of the distiller.

6. The apparatus according to claim 1, wherein a concentrated sulfuric acid solution, containing sulfur dioxide, is discharged from the distiller;
   the apparatus further comprising a reactor for reacting the sulfur dioxide with hydrogen peroxide to form sulfuric acid.

7. The apparatus according to claim 1, wherein concentrated sulfuric acid solution and a residue, at least one of which contains sulfur dioxide, are formed in the distiller during distillation of the to be treated solution;

the apparatus further comprising a reactor for reacting the sulfur dioxide, contained in the at least one of the concentrated sulfuric acid solution and the residue, with hydrogen peroxide to form sulfuric acid.

8. The apparatus according to claim 1, wherein the to be treated solution contains nitric acid, and the distiller includes a purifying column to distill the to be treated solution to form a high concentrated nitric acid solution.

9. A distilling apparatus for distilling a hydrogen peroxide-containing solution to be treated, comprising:

a remover for removing a substantial part of the hydrogen peroxide from the to be treated solution;

a distiller, connected to the remover, for storing therein the to be treated solution from which the hydrogen peroxide has been removed and distilling the solution to form a distillate, wherein the distiller includes a cooler for cooling a distillation gas formed by heating the to be treated solution in the distiller, and wherein the distiller includes a plurality of partitions retained in the distiller at equal intervals, each of the plurality of partitions having a plurality of pores; and a control unit for controlling a supply amount of to be treated solution stored in the distiller based on a liquid level of the to be treated solution in the distiller, wherein the to be treated solution is provided to the cooler as a cooling medium, before the solution is supplied to the distiller.

10. The apparatus according to claim 9, further comprising a liquid level detector, which is inserted to the distiller, for detecting the liquid level of the to be treated solution stored in the distiller.

11. The apparatus according to claim 9, wherein a concentrated solution containing a residue is stored in the distiller;

the apparatus further comprising a metering discharge mechanism for adjusting a discharge amount of the concentrated solution so that the residue is discharged from the distiller at a predetermined ration relative to a distillate.

12. The apparatus according to claim 9, wherein the distiller has a storage section for storing and heating to be treated solution, and the remover has a piping penetrating the storage section through which the to be treated solution containing hydrogen peroxide flows such the to be treated solution containing hydrogen peroxide is heated at the storage section.

13. The apparatus according to claim 9, wherein the distiller includes a first distiller and a second distiller;

the apparatus further comprising a connecting pipe for connecting the first distiller to the second distiller; and a heater provided on the connecting pipe for heating a concentrated solution flowing therethrough.

14. The apparatus according to claim 9, wherein the remover includes a catalyst for removing hydrogen peroxide from the to be treated solution.

15. The apparatus according to claim 9, wherein the to be treated solution contains sulfuric acid, and the distiller includes a purifying column to distill the to be treated solution to form a high concentrated sulfuric acid solution.

16. The apparatus according to claim 9, wherein the to be treated solution contains nitric acid, and the distiller includes a purifying column to distill the to be treated solution to form a high concentrated nitric acid solution.

17. A distilling apparatus comprising:

a distiller which stores therein a solution and distills the solution to form a distillate, wherein a gas containing nitric acid mist is generated when performing the distillation;

a liquid level detector disposed in the distiller which detects the liquid level of the solution;

a state detector for detecting a physical state of the solution contained in the distiller, wherein state detector includes a temperature sensor, a concentration sensor, and a specific gravity sensor;

a control unit for controlling a supply amount of solution stored in the distiller based on detection results of the liquid level detector and the state detector; and an exhaust chamber for absorbing the nitric acid mist contained in the gas.

18. A distilling apparatus comprising:

a concentrating column for heating a waste liquid to generate a vapor and condensing the vapor to generate a concentrated liquid, wherein the concentrating column filters the condensed vapor to separate out impurities and removes water from waste liquid in the concentrating column;

a liquid level detector disposed in the concentrating column which detects the liquid level of the wasted liquid;

a state detector for detecting a physical state of the wasted liquid in the concentrating column, wherein state detector includes a temperature sensor, a concentration sensor, and a specific gravity sensor;

a control unit for controlling a supply amount of wasted liquid in the concentrating column based on detection results of the liquid level detector and the state detector; and a purifying column coupled to the concentrating column for heating the concentrated liquid, wherein the purifying column removes residue from the heated liquid in the purifying column and condenses the heated liquid to produce about a 90% purified waste liquid.

* * * * *